United States Patent [19]

Chang et al.

[11] Patent Number: 4,839,404

[45] Date of Patent: Jun. 13, 1989

[54] BITUMINOUS COMPOSITIONS HAVING HIGH ADHESIVE PROPERTIES

[75] Inventors: Dane Chang, Houston, Tex.; David L. Wolfe, Midland, Mich.

[73] Assignee: The Dow Chemical Company, Midland, Mich.

[21] Appl. No.: 889,664

[22] Filed: Jul. 28, 1986

[51] Int. Cl.$^4$ .................. C08L 33/02; C08L 95/00
[52] U.S. Cl. ............................ 524/69; 524/70; 524/71; 524/68
[58] Field of Search ................. 524/69, 70, 71, 68

[56] References Cited

U.S. PATENT DOCUMENTS

| | | | |
|---|---|---|---|
| 3,484,507 | 12/1969 | Smith | 524/69 |
| 3,634,293 | 1/1972 | Bonitz et al. | 524/69 |
| 3,980,598 | 9/1976 | Moorwessel et al. | 524/69 |
| 3,985,694 | 10/1976 | Petrucco et al. | 524/69 |
| 4,524,156 | 6/1985 | Cogliano | 521/83 |
| 4,591,611 | 5/1986 | Jenkins et al. | 524/69 |
| 4,595,636 | 6/1986 | Wiercinski et al. | 524/69 |

FOREIGN PATENT DOCUMENTS

| | | | |
|---|---|---|---|
| 60-158256 | 8/1985 | Japan | 524/69 |
| 1024493A | 6/1983 | U.S.S.R. | 524/69 |

*Primary Examiner*—Allan M. Lieberman
*Attorney, Agent, or Firm*—Bruce M. Kanuch

[57] ABSTRACT

A composition useful as a pavement material comprising a mixture of asphalt, aggregate and an interpolymer of an α-olefin monomer selected from the group consisting of an α,β-ethylenically unsaturated carboxylic acid or an ionomer of an α,β-ethylenically unsaturated carboxylic acid.

6 Claims, No Drawings

BITUMINOUS COMPOSITIONS HAVING HIGH ADHESIVE PROPERTIES

BACKGROUND OF THE INVENTION

Unique physical properties and an abundant supply have established asphalt as a major raw material for use in industrial applications that involve structural adhesive and waterproof protective films. The major markets for these industrial applications are road paving and roofing respectively. Both asphalt cement and mineral filled roofing asphalt can comprise a mixture of asphalt with silica or limestone based minerals. Consequently, chemical and physical factors which can influence the asphaltic coating of minerals are operative in both applications.

Residual oils and/or bituminous materials, such as asphalt, used in the preparation of pavements do not coat and adhere well to mineral aggregates unless the aggregate is substantially dry, and, for this reason, in conventional pavements it may be necessary to dry the mineral aggregate prior to blending with the bituminous material.

Mineral aggregates employed in road pavement range in character from hydrophilic to hydrophobic. In general, siliceous and acidic minerals, such as sands and gravels, tend to be hydrophilic while calcareous, alkaline minerals, such as limestone, tend to be more hydrophobic. It has been observed that the mineral aggregates appear to have a greater attraction for water than for oil or bitumens and that it is difficult to obtain complete or satisfactory coating of aggregates by oil or bitumen when water is present. Furthermore, even though satisfactory coating may be obtained by using dry aggregates, the oil or bitumen tends to be displaced if water enters the pavement or road.

One approach which has been used to decrease the severity of the problems attributed to poor adhesion between the aggregate and bitumens and/or stripping of the bitumen from the aggregate due to the presence of moisture has been to include an additive (hereinafter referred to as an antistripping agent) in the bitumen prior to combination with the aggregate. These antistripping agents serve to enhance the coating of the aggregate by bitumens and retard displacement of the aggregate-bitumen bond by water.

The art discloses several antistripping agents which are useful as additives in bitumens and asphalts. For example, U.S. Pat. No. 2,759,839 to Crews et al. discloses the use of certain amines as antistripping agents.

U.S. Pat. No. 3,985,694 teaches the use of terpenic resins and interpolymers of ethylene, methylacrylate and an organic acid improves certain properties of asphalt compositions such as adhesion to aggregates.

U.S. Pat. No. 3,867,162 discloses the use of tall oil as an adhesion promoter in bituminous emulsions.

U.S. Pat. No. 3,615,797 discloses the use of tertiary amines as bitumen additives which improve the adhesion properties of the bitumen. U.S. Pat. No. 3,978,014 discloses the use of bituminous compositions containing two polymeric materials; one which improves the resistance of the material to flow under elevated temperatures, and the second causes improved adhesion to other materials. The second polymer is characterized by having a molecular weight of at least 10,000, a solubility parameter (defined in Dutch Patent Application No. 6,706,408) of between 7.8 and 8.8 and a crystallinity of less than 60 percent at 25° C. The second polymer is disclosed to include for example polyethylene, polybutadiene, chlorinated polyethylene, ethylene, ethylacrylate copolymers, ethylene vinylacetate and the like. The polymers must each be employed in a minimum amount of 4 weight percent of the composition.

U.S. Pat. No. 4,430,127 discloses the use of an expoxylated polyamine to provide adhesion between aggregate materials and the bitumen.

In copending application Ser. No. 817,659; filed Jan. 10, 1986, certain olefinic polymers are employed in an amount of at least 1 part by weight of an asphalt blend to provide improved characteristics at elevated temperature. The polymers are disclosed to have a melting point between 140° F. and 350° F. and a melt flow index of at least 50 g/10 min. The blend is disclosed to have improved stability, antistrip and solvent resistance properties.

U.S. Pat. No. 3,364,168 discloses a blend of low molecular weight, low density polyethylene, refined grade lube oil and petroleum resin provides a material which can be employed as road paving substance and the like.

The present invention is based on the discovery that improved adhesion of aggregate and bitumen can be achieved by incorporating small amounts of certain α-olefin copolymers into the mixture.

SUMMARY OF THE INVENTION

The present invention comprises a composition comprising a bituminous material from about 90 to about 99.9 percent and a copolymer of an α-olefin (e.g. ethylene) an α,β-ethylenically unsaturated carboxylic acid (e.g. acrylic acid) from about 0.1 to about 10 percent or the neutralized salt thereof (ionomer); wherein the copolymer contains from about 5 to about 30 percent by weight of the α,β-ethylenically unsaturated carboxylic acid or ionomer and about 95 to about 70 percent by weight of the α-olefin. The composition is substantially free of α-olefin/ester copolymers since these tend to decrease the adhesive characteristics of the composition to the mineral aggregates. The above composition is mixed with from about 90 to about 96 percent by weight of mineral aggregate to form paving, roofing, and other type materials.

DETAILED DESCRIPTION OF THE INVENTION

The bituminous material employed in the practice of the present invention is not critical. Any bitumen, such as asphalt, tar, pitches or crude residuum containing asphalites can be employed. U.S. Pat. No. 3,317,447 contains a description of useful bituminous materials. The teachings of this patent are specifically incorporated herein by reference. In general, the bitumen which can be employed include conventional petroleum asphalts, natural asphalts, gilsonite, air blown asphalts, coal tar and other similar materials. The asphalts are characterized by having penetration grades of up to 300 as measured by ASTM Method D5. Preferred asphalts are the normal paving asphalts (e.g. AC2.5, AC5, AC10, AC20, AC30 and AC40. AC indicates asphalt cement, and the number indicates viscosity at 140° F. in Poises ÷ 100).

The interpolymers useful in the practice of the invention are prepared from the reaction of an α-olefin and a comonomer which adds polar characteristics to the olefin. The olefin preferably is a $C_1$ to $C_7$ α-olefin. Ethylene is preferred because of processing ease and cost.

The comonomer is a material which adds polar characteristics to the α-olefin and is selected from the group consisting of α,β-ethylenically unsaturated carboxylic acids, ionomers, and mixtures thereof.

The comonomers are preferably employed in a ratio which provides an interpolymer which has a sharp melting point between about 140° F. (60° C.) and about 350° F. (176.7° C.) the normal working temperature used in preparing the bituminuous material for use as paving material, roofing material or the like. The weight percent of the carboxylic acid in the interpolymer can range over a wide span. The amount will depend on the particular carboxylic acid employed. However, the maximum amount will be such that the interpolymer does not become incompatible with the bituminous material and tend to separate therefrom. This can be readily ascertained by simple laboratory testing prior to formulating the blend for use as a paving material or the like. The unsaturated carboxylic acid should be present in an amount ranging from about 5 to about 30 weight percent of the copolymer. An amount ranging from about 8 to about 20 weight percent is preferred because of better antistrip properties. It has been found that adhesive properties improve as the amount of carboxylic acid increases in the interpolymer while the cohesive or elastic properties tend to decrease as the Melt Flow Index of the interpolymer is increased at certain levels of carboxylic acid. At the higher unsaturated carboxylic acid levels, this trend is less pronounced. The copolymer can have a melt flow index ranging from about 1.5 g/10 min. to about 6,000 g/10 min or higher (determined by ASTM D-1238-Sch. E.)

The interpolymer preferably has a Melt Flow Index (MI) and percentage of copolymer which will cause the interpolymer to form a homogenous blend with the bitumen at a temperature of between about 200° F. (93° C.) and 350° F. (176.7° C.).

Specific examples of comonomers which can be employed include, for example, acrylic acid, methacrylic acid, crotonic acid, and ionomers and the like. The neutralizing cation for the ionomers are usually Na, Mg, or Zn. Other mono, di and trivalent metals such as Ca, Al, K and Li can be used.

A copolymer containing ethylene and acrylic and/or methacrylic acid in an amount ranging from about 5 to about 30 percent, preferably about 8 to about 20 percent of acrylic and/or methacrylic acid is preferred. These copolymers are well known in the art as well as their method of manufacture. U.S. Pat. Nos. 4,351,931; 3,520,861; 4,252,924; and 3,969,434 describe such polymers and their method of manufacture. The teachings of these patents are specifically incorporated herein by reference.

The amount of copolymer to be used in the bitumen blend can range from about 0.1 to about 10 percent by weight, preferably from about 0.1 to about 5 percent and most preferred about 1 percent or less is employed. The blend is substantially free of copolymers of an α-olefin and an acetate such as vinyl acetate since these copolymers tend to decrease the adhesiveness of the blend to mineral aggregates. However, surprisingly, the absence of the acetate does not detract from the other favorable properties of the blend such as elasticity of the blend.

The copolymer is admixed with the bitumen material, e.g. asphalt, in any convenient manner employing equipment which is normally used in paving, roofing and other construction projects. The bitumen material and the copolymer are hot mixed at a temperature of from at least about 140° F. (60° C.) up to the decomposition temperature of the copolymer. The copolymer, as finely divided solids, pellets, etc. or in solution, in a solvent e.g. with benzene or toluene or as an aqueous dispersion, is mixed into the molten asphalt.

Aggregates which can be employed include both silica and limestone based minerals.

EXAMPLES

In these examples, a sample is prepared containing asphalt, an aggregate and a certain antistrip additive. The sample is then subjected to a standard "boil test" to ascertain the adhesion of the asphalt to the aggregate. The "boil test" is described in "Texas Boiling Test for Evaluating Moisture Susceptibility of Asphalt Mixtures" T. W. Kennedy, F. L. Roberts, J. N. Anagnas, Research Report No. 253-5, January 1984, conducted for Texas State Department of Highways by Center For Transportation Research, Bureau of Engineering Research, The University of Texas at Austin. The boil test consists of boiling in distilled water a sample of the blend and determining, visually, the percentage coverage of the aggregate with asphalt at the conclusion of the test. Greater coverage indicates better performance of the antistrip agent.

In a second series of tests, the prepared samples are subjected to a standard "freeze-thaw" test. In this test, a sample is immersed in distilled water and subjected to 24 hours freeze-thaw conditions until the sample cracks and falls apart. The number of freeze-thaw cycles the sample can withstand before cracking indicates the additive performance. The "freeze-thaw" test is described in Kennedy, T. W. et al. "Texas Freeze-Thaw Pedestal Test for Evaluating Moisture Susceptibility for Asphalt Mixtures", Research Report No. 253-3, Research Project 3-9-79-253 conducted for Texas State Department of Highways and Public Transportation by Center For Transportation Research Bureau of Engineering Research, The University of Texas at Austin, February, 1982.

Texas Cosden brand asphalt (AC-20 grade) was used in the tests. This particular asphalt is known to have poor field stripping performance. The amount of asphalt content used was determined on the basis of Test Method Tex-204-F. For tests of individual aggregates, the first trial mixture was prepared at the design asphalt content for the mixture in which the aggregate is to be used. Based on the results, subsequent mixtures were prepared at one-half percent increments above or below this trial value. The objective is to coat the aggregate particles with approximately the same asphalt film thickness. There should be very little asphalt left on the mixing bowl after the mixture is removed. In these tests, the amount of asphalt used for all aggregates tested is 5.6 percent for the boil tests and 6.1 percent for the freeze-thaw tests.

BOIL TEST

A. Mixture Preparation

Fifty grams of individual aggregate is heated in an oven at 160° C. for 2 hours before mixing. The asphalt cement without antistrip additive is heated at 160° C. for at least 8 hours. This will cause some hardening of the asphalt and therefore, simulates asphalts which have been plant-mixed. Then, 3 g (5.6 percent) of asphalt is weighed out into a crucible. additive to be tested, is added to the asphalt as a weight percent of the asphalt reported in the following Tables. The crucible with asphalt and additive is heated at 160° C. with thorough manual mixing for 10 minutes. At this temperature the viscosity of asphalt is low enough to promote even distribution of additive in the asphalt. Heating will also evaluate the thermal stability of the antistripping additive. At the appropriate time, hot aggregate is poured into the asphalt/additive mix and mixed manually on a hot plate as rapidly and thoroughly as possible for 5 minutes. The mixture is then transferred to aluminum foil and allowed to cool at room temperature for at least 2 hours before testing.

B. Test Procedures

A one-liter beaker is filled with 500 ml of distilled water and heated to boiling. The prepared aggregate-asphalt mixture which is at room temperature is then added to the boiling water. The water should be maintained at a medium boil for 10 minutes while stirring with a glass rod at 3-minute intervals. During and after boiling, the stripped asphalt should be skimmed away from the surface of the water with a paper towel to prevent recoating of the aggregate. The mixture is then allowed to cool to room temperature while still in the beaker. After cooling, the water is drained from beaker and the wet mixture is emptied onto a paper towel and allowed to dry.

The percentage of asphalt retained on the aggregate is determined by visual observation. To standardize this evaluation, a set of 10 sample mixtures representing a scale of from 0 to 100 percent. asphalt retention was prepared. By referring to these standard mixtures, the percentage of asphalt retention can be determined. Higher percentage indicates better adhesion. For each additive, the test was done in duplicate, and the average was used to report the test result. A 70 percent or higher asphalt retention after boil test indicates possible non-stripping field performance.

FREEZE-THAW TEST

A. Preparation of Mixture Specimens

Test specimen 19.05±0.127 mm (0.75±0.005 in) in height and 41.33 mm (1.627 in) in diameter are prepared, as follows. The aggregate, 46 g for each test specimen, is heated at 160° C. for at least 2 hours before mixing with 3 g (6.1 percent) of asphalt in a crucible. The additive is added to the asphalt, in the weight percent of the asphalt as indicated in the following Tables. The crucible with asphalt and additive is heated at 160° C. with manual mixing for 5 minutes. The hot aggregate is then poured into the asphalt/additive mix and mixed as thoroughly and rapidly as possible for 5 minutes. The mixture is then heated at 150° C. for one-half hour and cooled for over 30 minutes.

The compaction of the asphalt mixture into specimens is done in a 1018 cold rolled steel cylindrical mold equipped with a base plate and ram. This mold has a 41.33 mm (1.627 in) inside diameter and is 88.9 mm (3.5 in) in height. The base plate is 41.28 mm (1.625 in) in base diameter and 12.7 mm (0.5 in) in height. The nipple on the center top of the base plate is 6.35 mm (0.25 in) in both diameter and height. The ram is 41.28 mm (1.625 in) in diameter and 114.3 mm (4.5 in) in height. After mixing but before compaction, the mixture is reheated at 150° C. for 20 minutes then quickly transferred into the assembled cylinder mold and base plate. The molding ram is inserted and the sample is compacted by applying a constant load of 6,200±50 lbs. on a hydraulic molding press for 7 minutes. The briquet is extracted from the mold and allow to cool. The height of the briquet is 19.05±0.127 mm (0.75±0.005 in). The briquet is cured on a flat surface at room temperature for 2 days.

The briquet is then placed on a stress pedestal. This pedestal is made of plexiglass or polycarbonate, has a 10° beveled, 50.8 mm (2.00 in) in diameter, 11.43 mm (0.45 in) in height with a nipple on the top 6.35 mm (0.25 in) in diameter by 3.56 mm (0.14 in) in height. The stress pedestal with briquet is placed in an 8 oz polypropylene wide mouth jar and distilled water is added until it is about one-half inch over the briquet. The jar is capped.

B. Test Procedures

The jar is placed in a temperature-controlled freezer at −12°±3° C. for 15 hours. The jar is then transferred to a temperature-controlled oven at 50°±2° C. for 9 hours. At the end of each complete cycle, the briquet surface is examined for appearance of cracks. If no crack is visible, the specimen is subjected to additional freeze-thaw cycles and examined again until a surface crack appears. The number of freeze-thaw cycles required to crack the briquet is recorded. For each individual additive, 2 specimens are prepared for testing and the average of the results of each test is reported as the test result. If the number of cycles to failure of the two specimens varied by more than 4, additional specimens were prepared and tested until consistent test values were secured. The number of freeze-thaw cycles is related to the effectiveness of the additive. A 25 cycle of freezing and thawing without cracking may indicate non-stripping field performance.

Four siliceous aggregates were tested. They were selected from four geographic areas of the United States. The names and location are: Davidson (Georgia); Waco (Texas); Gifford-Hill (Bryan, Tex.); and Helms (Nevada). A uniform size was employed. Between 8 and 20 mesh, (U.S. Standard Sieve Series) was used for the boil test and between 20 and 35 mesh (U.S. Standard Sieve Series) was used for the freeze-thaw test. The aggregates were rinsed several times with water and thoroughly dried to a constant weight at 150°±3° C. prior to use.

Tables I, II and III report the results of these tests.

TABLE 1

| Test No. | Aggregate Test Type Additive | One Percent By Weight Additive | | | | | | | |
|---|---|---|---|---|---|---|---|---|---|
| | | Davidson | | Gifford Hill | | Waco | | Helms | |
| | | B | FT | B | FT | B | FT | B | FT |
| 1 | EAA (6.5% AA, 9 MI) | 85 | 30 | 85 | 14 | 80 | 29 | — | 26 |
| 2 | EAA (8% AA, 700 MI) | 85 | 29 | 85 | 16 | 85 | 27 | — | 30 |
| 3 | EAA (8% AA, 2600 MI) | 75 | 29 | 80 | 17 | 60 | 16 | — | 26 |
| 4 | EAA (9% AA, 1.5 MI) | 95 | 40* | 100 | 21 | 100 | 34 | — | 40 |
| 5 | EAA (9% AA, 10 MI) | 90 | 40 | 90 | 19 | 90 | 30 | — | 36 |
| 6 | EAA (12% AA, 1.5 MI) | 95 | 40 | 95 | 19 | 90 | 31 | — | 40 |

TABLE 1-continued

One Percent By Weight Additive

| Test No. | Aggregate Test Type Additive | Davidson B | Davidson FT | Gifford Hill B | Gifford Hill FT | Waco B | Waco FT | Helms B | Helms FT |
|---|---|---|---|---|---|---|---|---|---|
| 7 | EAA (16% AA, 22 MI) | 100 | 40 | 95 | 19 | 95 | 26 | — | 38 |
| 8 | EAA (20% AA, 300 MI) | 100 | 40 | 100 | 13 | 100 | 25 | — | 34 |
| 9 | EAA (20% AA, 1300 MI) | 95 | 40 | 100 | 17 | 100 | 20 | — | 30 |
| 10 | EAA (20% AA, 2600 MI) | 95 | 40 | 100 | 13 | 100 | 22 | — | 31 |
| 11 | EAA/Mg Ionomer (20% AA, 2.5 MI) | 85 | 30 | 70 | 15 | 70 | 29 | — | — |
| 12 | EAA/Mg Ionomer (20% AA, 5 MI) | 75 | 34 | 80 | 13 | 40 | 21 | — | — |
| 13 | EAA/Mg Ionomer (20% AA, 10 MI) | 85 | 32 | 85 | 18 | 80 | 24 | — | — |
| 14 | Allied EAA AC-540 (4.5% AA, WAX) | 30 | 16 | 50 | 10 | 40 | 18 | — | — |
| 15 | Allied EAA AC-580 (8% AA, WAX) | 60 | 18 | 75 | 11 | 60 | 16 | — | — |
| 16 | Allied EAA AC-5120 (12.8% AA, WAX) | 85 | 15 | 85 | 13 | 85 | 20 | — | — |
| 17 | Nucrel®-0910 (9% MAA, 10 MI) | 80 | 20 | 85 | 18 | 50 | 25 | — | — |
| 18 | Surlyn®-8940 Ionomer (14% MAA, 2.8 MI) | 50 | 14 | 85 | 20 | 40 | 15 | — | — |
| 19 | Surlyn®-9910 Ionomer (14% MAA, 0.7 MI) | 30 | 12 | 70 | 17 | 30 | 13 | — | — |

B - The percentage of asphalt retention on aggregate surface after boil test.
FT - The number of freeze-thaw cycles asphalt concrete briquet withstands before cracking.
EAA - Ethylene-acrylic acid copolymer.
AA - Percent by weight of acrylic acid in the copolymer.
MI - Melt flow index.
EAA/Mg Ionomer - % neutralization
Allied
AC540 - 4.5% AA, WAX
AC580 - 8% AA, WAX
AC5120 - 12.8% AA, WAX
The molecular weight of these materials are too low to use melt index as identifying criteria. They are referred to in the art as "WAXES".
Nucrel - (Trademark of duPont Company)
Surlyn - (Trademark of duPont Company)
Surlyn - (Trademark of duPont Company)
"—" means not tested.
*All "40" figures in FT columns (all columns) in Tables I and II means the test was stopped at forty cycles. The specimen was, however, still intact at this point.

TABLE II

DIFFERENT ADDITIVE WEIGHT %

| Test No. | ADDITIVE % | DAVIDSON 0.25% B | FT | 0.5% B | FT | 1.0% B | FT | GIFFORD - HILL 0.25% B | FT | 0.5% B | FT | 1.0% B | FT | WACO 0.25% B | FT | 0.5% B | FT | 1.0% B | FT |
|---|---|---|---|---|---|---|---|---|---|---|---|---|---|---|---|---|---|---|---|
| 1 | EAA (6.5% AA, 9 MI) | 80 | 17 | 80 | 22 | 85 | 30 | 60 | 11 | 80 | 12 | 85 | 14 | 80 | 19 | 80 | 25 | 80 | 29 |
| 2 | EAA (8% AA, 700 MI) | 75 | 14 | 80 | 20 | 85 | 29 | 70 | 9 | 80 | 11 | 85 | 16 | 70 | 16 | 75 | 21 | 85 | 27 |
| 3 | EAA (8% AA, 2600 MI) | 60 | 11 | 60 | 19 | 75 | 29 | 60 | 7 | 60 | 9 | 80 | 17 | 50 | 8 | 60 | 10 | 60 | 16 |
| 4 | EAA (9% AA, 1.5 MI) | 80 | 19 | 90 | 27 | 95 | 40* | 80 | 15 | 100 | 21 | 100 | 21 | 75 | 20 | 90 | 26 | 100 | 34 |
| 5 | EAA (9% AA, 10 MI) | 70 | 17 | 80 | 24 | 90 | 40 | 70 | 12 | 80 | 17 | 90 | 19 | 70 | 18 | 85 | 24 | 90 | 30 |
| 6 | EAA (12% AA, 1.5 MI) | 80 | 19 | 80 | 28 | 95 | 40 | 75 | 16 | 85 | 19 | 95 | 19 | 70 | 20 | 85 | 28 | 90 | 31 |
| 7 | EAA (16% AA, 22 MI) | 80 | 15 | 90 | 26 | 100 | 40 | 70 | 13 | 85 | 17 | 95 | 19 | 75 | 19 | 85 | 24 | 95 | 26 |
| 8 | EAA (20% AA, 300 MI) | 85 | 15 | 90 | 26 | 100 | 40 | 80 | 13 | 90 | 13 | 100 | 13 | 85 | 19 | 90 | 23 | 100 | 25 |
| 9 | EAA (20% AA, 1300 MI) | 80 | 12 | 85 | 22 | 95 | 40 | 80 | 10 | 90 | 13 | 100 | 17 | 80 | 16 | 90 | 19 | 100 | 20 |
| 10 | EAA (20% AA, | 80 | 11 | 80 | 22 | 95 | 40 | 70 | 9 | 80 | 11 | 100 | 13 | 80 | 16 | 90 | 17 | 100 | 22 |

TABLE II-continued

| Test No. | ADDITIVE % | DIFFERENT ADDITIVE WEIGHT % | | | | | | | | | | | | | | | | |
|---|---|---|---|---|---|---|---|---|---|---|---|---|---|---|---|---|---|---|
| | | DAVIDSON | | | | | | GIFFORD - HILL | | | | | | WACO | | | | |
| | | 0.25% | | 0.5% | | 1.0% | | 0.25% | | 0.5% | | 1.0% | | 0.25% | | 0.5% | | 1.0% |
| | | B | FT | B | FT | B | FT | B | FT | B | FT | B | FT | B | FT | B | FT | B | FT |
| | 2600 MI) | | | | | | | | | | | | | | | | | | |

TABLE III

RESULTS OF FREEZE-THAW TEST (GIFFORD GILL AGGREGATE) AND BOIL TEST (WACO AGGREGATE) USING VARIOUS EAA COPOLYMERS AS ASPHALT ADDITIVES AT DIFFERENT CONCENTRATIONS

| Test No. | ADDITIVE | GIFFORD HILL | | | | | | | WACO | | | | |
|---|---|---|---|---|---|---|---|---|---|---|---|---|---|
| | | 0.25% | 0.5% | 1% | 2% | 3% | 4% | 5% | 1% | 2% | 3% | 4% | 5% |
| 1 | EAA (6.5% AA, 9 MI) | — | — | 14 | — | — | — | — | 80 | 95 | 95 | 95 | 90 |
| 2 | EAA (8% AA, 700 MI) | — | — | 16 | — | — | — | — | 85 | 95 | 100 | 100 | 95 |
| 3 | EAA (8% AA, 2600 MI) | 10 | 13 | 17 | 23 | 27 | 31 | 38 | 60 | 80 | 95 | 100 | 100 |
| 4 | EAA (20% AA, 300 MI) | 8 | 12 | 13 | 13 | 18 | 22 | 29 | 100 | — | — | — | — |

We claim:

1. A composition comprising a bitumen from about 98 to about 99.9 percent by weight, about 0.1 to about 2 percent by weight of at least one copolymer of an $\alpha$-olefin monomer and an $\alpha,\beta$-ethylenically unsaturated carboxylic acid comonomer or ionomer thereof wherein the copolymer comprises from about 5 to about 30 weight percent of the $\alpha,\beta$-ethylenically unsaturated carboxylic acid comonomer and about 95 to about 70 weight percent of the $\alpha$-olefin monomer and wherein the composition is further characterized as being substantially free of $\alpha$-olefin/ester copolymers.

2. The composition of claim 1, wherein the comonomer is selected from the group consisting of acrylic acid and methacrylic acid.

3. The composition of claim 1 wherein the copolymer has a melt flow index ranging from 1.5 g/10 min to about 3000 g/10 min.

4. The composition of claim 1 wherein the copolymer contains from about 8 to about 20 percent of acrylic acid, ethacrylic acid or mixtures of methacrylic acid and acrylic acid.

5. The composition of claim 1 including in addition a mineral aggregate.

6. The composition of claim 1 wherein the copolymer is present in an amount of about 1 percent or less of the composition.

* * * * *